United States Patent
Yang (10) Patent No.: US 11,309,733 B1
(45) Date of Patent: Apr. 19, 2022

(54) UNINTERRUPTIBLE PORTABLE POWER BANK

(71) Applicant: SAMLIFE TECHNOLOGY CO., LTD., Taoyuan (TW)

(72) Inventor: Fu-I Yang, Taoyuan (TW)

(73) Assignee: Samlife Technology Co., Ltd., Taoyuan (TW)

( * ) Notice: Subject to any disclaimer, the term of this patent is extended or adjusted under 35 U.S.C. 154(b) by 0 days.

(21) Appl. No.: 17/134,692

(22) Filed: Dec. 28, 2020

(30) Foreign Application Priority Data

Oct. 5, 2020 (TW) .................................. 109134423

(51) Int. Cl.
*H02J 7/00* (2006.01)
*H02J 9/06* (2006.01)

(52) U.S. Cl.
CPC ............ *H02J 9/062* (2013.01); *H02J 7/0029* (2013.01); *H02J 7/0047* (2013.01); *H02J 7/0063* (2013.01); *H02J 7/00711* (2020.01); *H02J 9/061* (2013.01); *H02J 9/068* (2020.01)

(58) Field of Classification Search
CPC .......... H02J 9/062; H02J 9/068; H02J 7/0063; H02J 7/00711; H02J 7/0029; H02J 9/061; H02J 7/0047
USPC ............................................................ 307/66
See application file for complete search history.

(56) References Cited

U.S. PATENT DOCUMENTS

| 6,795,322 | B2 * | 9/2004 | Aihara | H02J 9/061 363/37 |
| 2007/0047100 | A1 * | 3/2007 | Takahashi | H02J 9/061 359/689 |
| 2009/0236913 | A1 * | 9/2009 | Mariasis | H02J 9/062 307/66 |
| 2014/0139022 | A1 * | 5/2014 | Bush | H02M 5/40 307/31 |
| 2021/0203183 | A1 * | 7/2021 | Lin | H02M 1/32 |

\* cited by examiner

*Primary Examiner* — Richard Tan
(74) *Attorney, Agent, or Firm* — Rosenberg, Klein & Lee (57) ABSTRACT

An uninterruptible portable power bank, including: a portable power bank, the PWM charge and discharge control circuit is coupled to the AC to DC transformer circuit, the battery and the protection circuit module and the DC to AC transformer circuit, the automatic power switch is coupled to the first AC power transmission interface, the AC power output interface and the DC to the AC transformer circuit, the AC to DC transformer circuit is coupled to the first AC power transmission interface, the automatic power switch is connected to the first AC power transmission interface and the AC power output interface while connected with the wall power, and turn to connect to the DC to AC transformer circuit and AC power output interface while the wall power is cut off; and an AC power transmission cable having a second AC power transmission interface and a second wall power input interface.

6 Claims, 13 Drawing Sheets

FIG.14

# US 11,309,733 B1

UNINTERRUPTIBLE PORTABLE POWER BANK

BACKGROUND OF THE INVENTION

1. Field of the Invention

An uninterruptible portable power bank, especially one that let the power bank having the feature of providing power uninterruptedly.

2. Description of the Related Art

Portable electronic products are becoming more and more popular. Since portable electronics are not usually used in the office or at home, thus backup power becomes very important, therefore, the power bank was born accordingly; in addition, the uninterruptible power system is a device that continuously provides backup power for electrical equipment to maintain the normal operation under the condition of abnormal mains power; however, the internal power of the uninterruptible power system is not used as a portable power supply, so the portable power bank is left and unused while in the area having the wall power.

SUMMARY OF THE INVENTION

A primary objective of the present invention is to solve the problem that the power bank is left and unused while in the area having the wall power, so as to let portable power bank can providing power uninterruptedly.

In order to achieve the above objective, the feature of the first type of the present invention, including: a portable power bank, having a first AC power transmission interface, an AC to DC transformer circuit and a least an AC power output interface, a PWM charge and discharge control circuit, a battery and protection circuit module, a DC to AC transformer circuit and an automatic power switch, the AC to DC transformer circuit is coupled to the first AC power transmission interface, the PWM charge and discharge control circuit is coupled to the AC to DC transformer circuit, the battery and the protection circuit module and the DC to AC transformer circuit, the automatic power switch is coupled to the first AC power transmission interface, the AC power output interface and the DC to the AC transformer circuit, the automatic power switch is connected to the first AC power transmission interface and the AC power output interface while connected with the wall power, and turn to connect to the DC to AC transformer circuit and AC power output interface while the wall power is cut off; and an AC power transmission cable having a second AC power transmission interface and a second wall power input interface.

The feature of the second type of the present invention, including:

A portable power bank, having a first AC power transmission interface, a first DC power transmission interface and a least an AC power output interface, a PWM charge and discharge control circuit, a battery and protection circuit module, a DC to AC transformer circuit and an automatic power switch, the PWM charge and discharge control circuit is coupled to the first DC power transmission interface, the battery and protection circuit module is coupled to the DC to AC transformer circuit, the automatic power switch is coupled to the first AC power transmission interface, the AC power output interface is coupled to the DC to AC transformer circuit, the automatic power switch is connected to the first AC power transmission interface and the AC power output interface while connected with the wall power, and turn to connect to the DC to AC transformer circuit and AC power output interface while the wall power is cut off; a charger, having a second DC power transmission interface, a first wall power input interface and an AC to DC transformer circuit, the AC to DC transformer circuit is coupled to the second DC power transmission interface and the first wall power input interface; and an AC power transmission cable having a second AC power transmission interface and a second wall power input interface.

The feature of the third type of the present invention, including:

A portable power bank, having a first AC power transmission interface, a first DC power transmission interface and a least an AC power output interface, a PWM charge and discharge control circuit, a battery and protection circuit module, a DC to AC transformer circuit and an automatic power switch, the PWM charge and discharge control circuit is coupled to the first DC power transmission interface, the battery and protection circuit module is coupled to the DC to AC transformer circuit, the automatic power switch is coupled to the first AC power transmission interface, the AC power output interface is coupled to the DC to AC transformer circuit, the automatic power switch is connected to the first AC power transmission interface and the AC power output interface while connected with the wall power, and turn to connect to the DC to AC transformer circuit and AC power output interface while the wall power is cut off; and a charger, having a second AC power transmission interface, a second DC power transmission interface, a wall power input interface and an AC to DC transformer circuit, the AC to DC transformer circuit is coupled to the second DC power transmission interface and the wall power input interface, the second AC power transmission interface is coupled to the wall power input interface.

Moreover, the portable power bank has more than one DC power output interface and a DC to DC transformer circuit, the DC to DC transformer circuit is coupled to the DC power output interface and the PWM charge and discharge control circuit. And the portable power bank has a power display interface, the power display interface is coupled to the PWM charge and discharge control circuit.

Whereby when the first DC power transmission interface is coupled to the second DC power transmission interface, and when the first AC power transmission interface is coupled to the second AC power transmission interface, and the first wall power input interface and second wall power input interface is coupled to the wall power, the battery and the protection circuit module is able to be charged by the AC to DC transformer circuit and the PWM charge and discharge control circuit; when the wall power is cut off, the battery and the protection circuit module is able to supply power to the AC power output interface by the PWM charge and discharge control circuit, the DC to AC transformer circuit 16 and the automatic power switch.

DETAILED DESCRIPTION OF THE PREFERRED EMBODIMENT

Referring to FIGS. 1-5, the first embodiment of the present invention including:

a portable power bank 10, having a first AC power transmission interface 11, a first DC power transmission interface 12 and a least an AC power output interface 13, a PWM charge and discharge control circuit 14, a battery and protection circuit module 15, a DC to AC transformer circuit 16, a DC power output interface 17, a DC to DC transformer circuit 18, a power display interface 19 and an automatic power switch 30, the PWM charge and discharge control circuit 14 is coupled to the AC to DC transformer circuit 24, the battery and the protection circuit module 15, the DC to AC transformer circuit 16, the DC to DC transformer circuit 18 and the power display interface 19, the DC to DC transformer circuit 18 is coupled to the DC power output interface 17, the automatic power switch 30 is coupled to the first AC power transmission interface 11, the AC power output interface 13 and the DC to the AC transformer circuit 16, the automatic power switch 30 is connected to the first AC power transmission interface 11 and the AC power output interface 13 while connected with the wall power, and turn to connect to the DC to AC transformer circuit 16 and AC power output interface 13 while the wall power is cut off;

a charger 20a, having a second DC power transmission interface 22, a first wall power input interface 23 and an AC to DC transformer circuit 24, the AC to DC transformer circuit 24 is coupled to the second DC power transmission interface 22 and the first wall power input interface 23; and an AC power transmission cable 20b having a second AC power transmission interface 21 and a second wall power input interface 23a.

Figure 1:
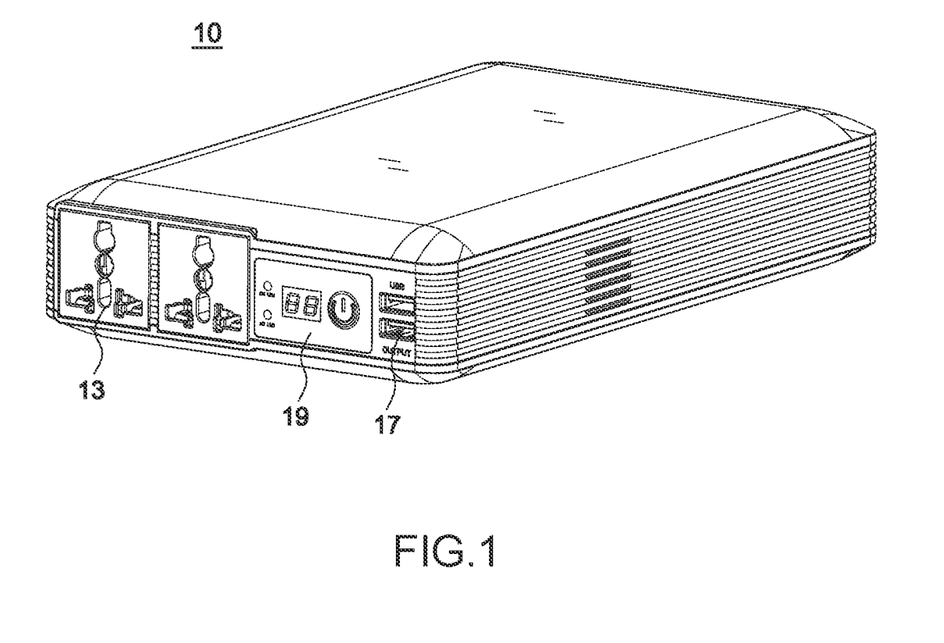
FIG. 1 is a perspective view of the portable power bank of the present invention.
Figure 2:
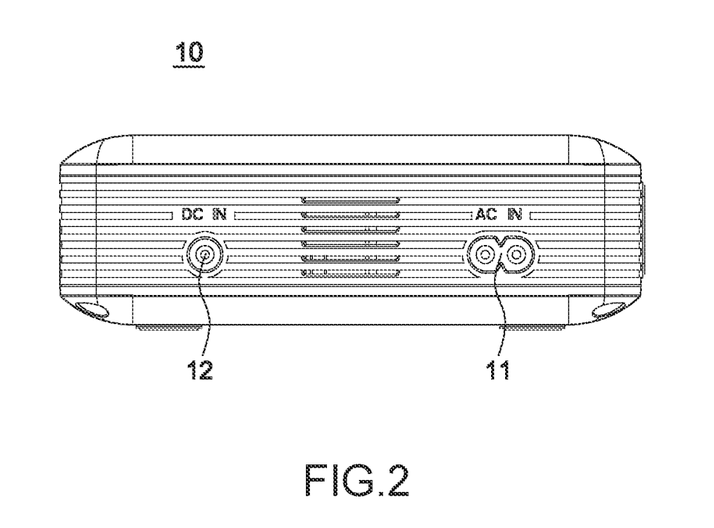
FIG. 2 is a rear view of the portable power bank of the present invention.
Figure 3:
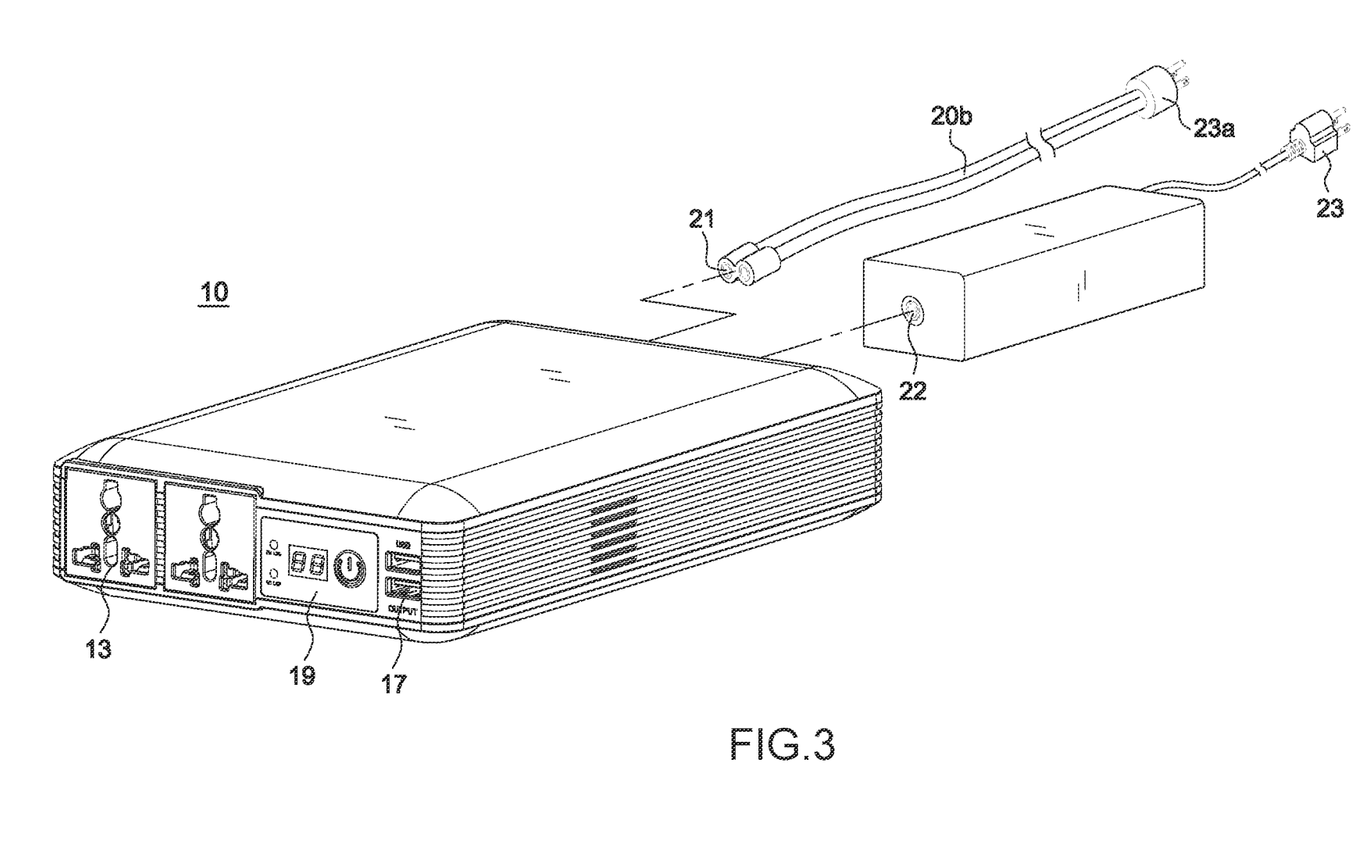
FIG. 3 is a schematic diagram illustrating the connection of the portable power bank and the charger of the first embodiment.
Figure 4:
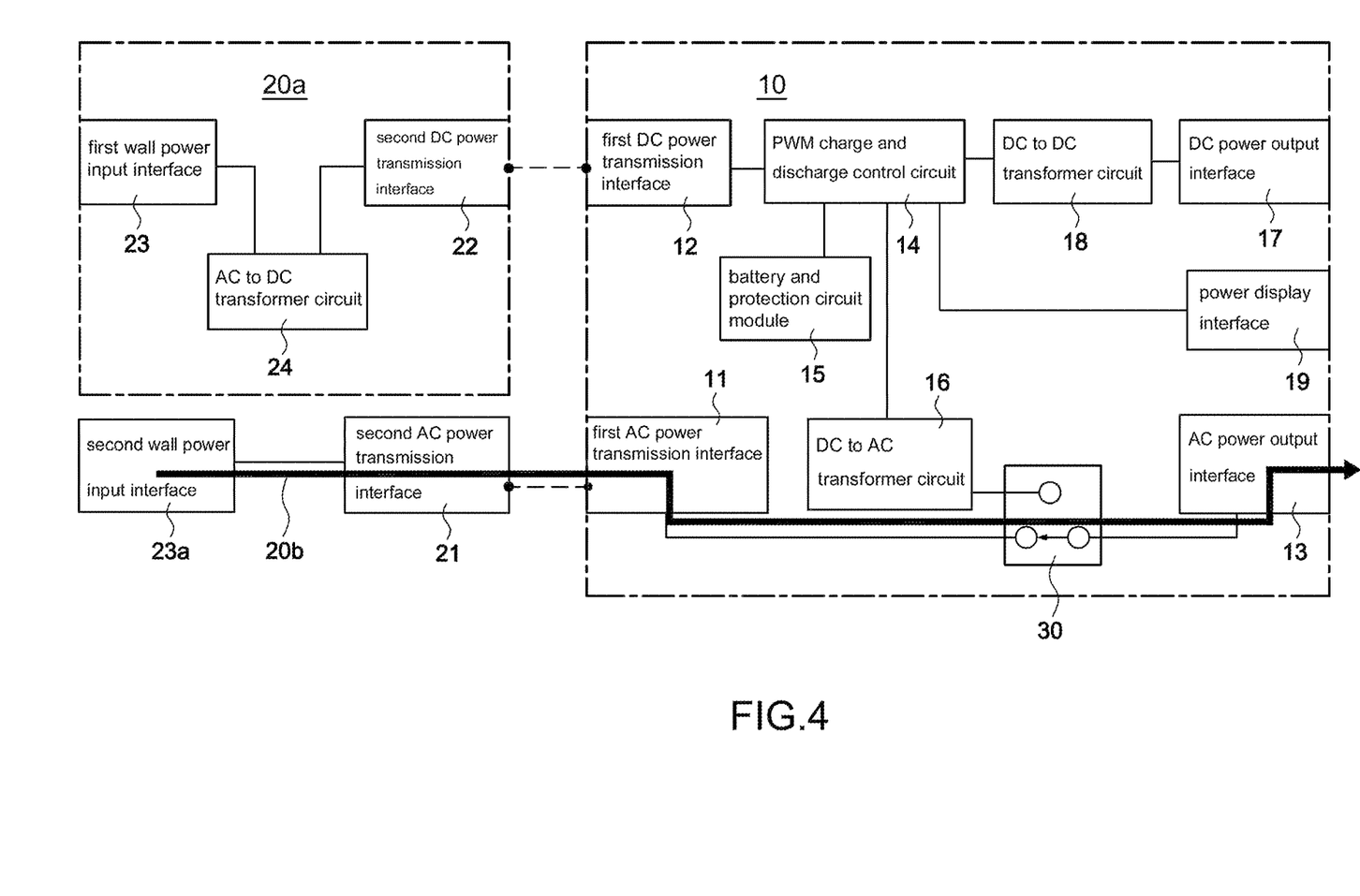
FIG. 4 is a block diagram illustrating the circuit of the first embodiment while the power is supplied by the wall power.
Figure 5:
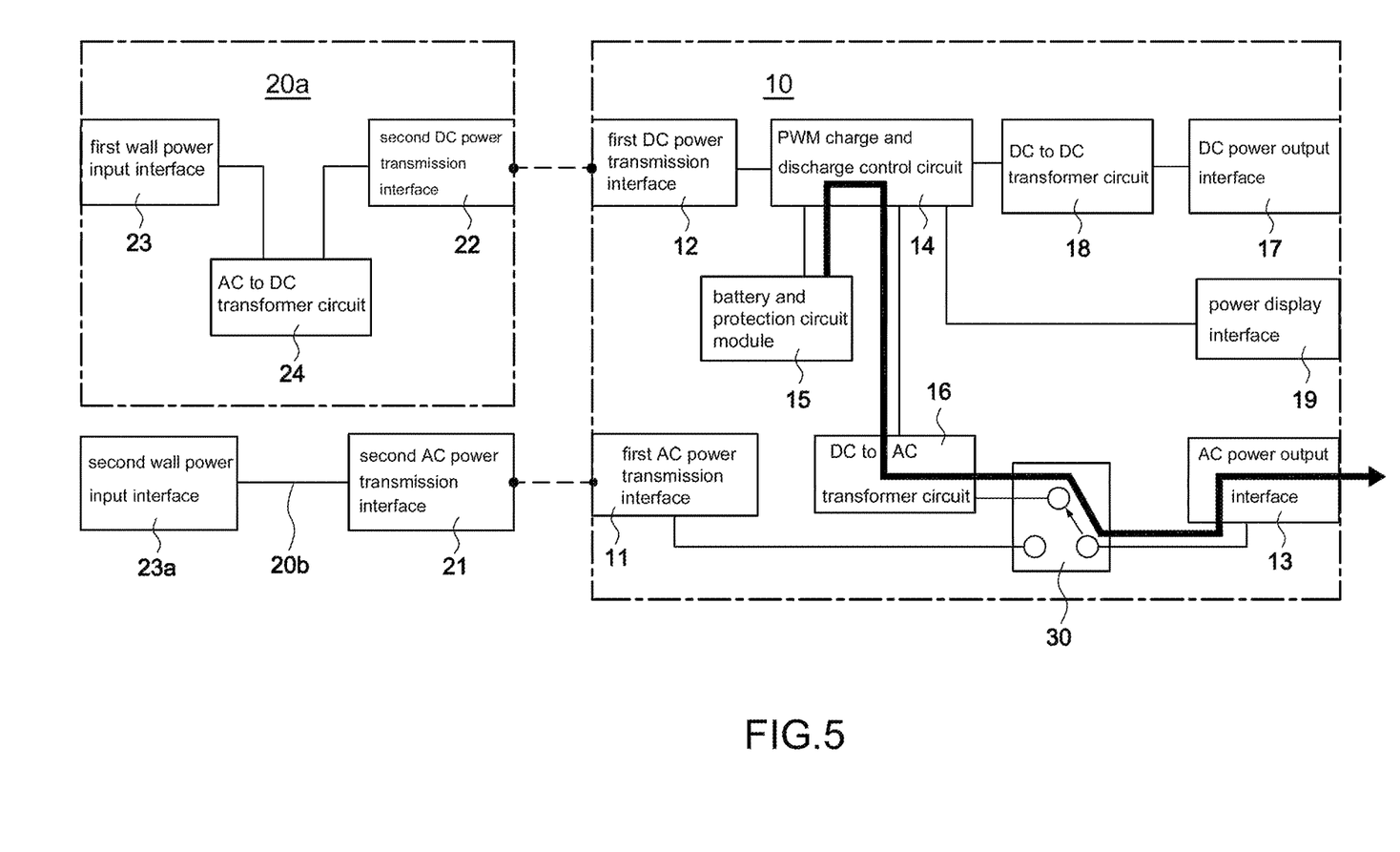
FIG. 5 is a block diagram illustrating the circuit of the first embodiment while the power is supplied by the battery.
Figure 6:
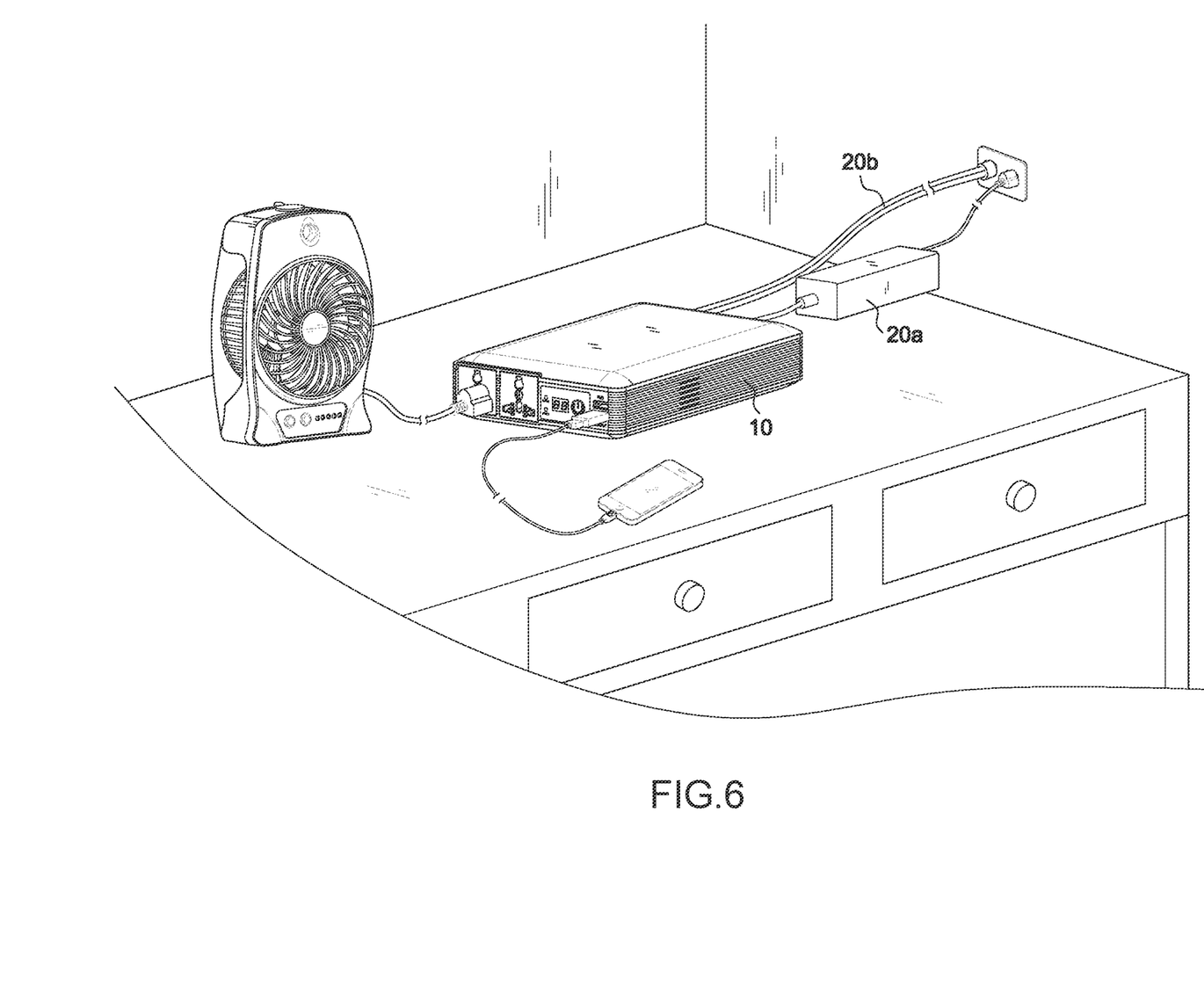
FIG. 6 is a schematic diagram illustrating the portable power bank of the first embodiment having the uninterruptible power supplying feature.
Figure 7:
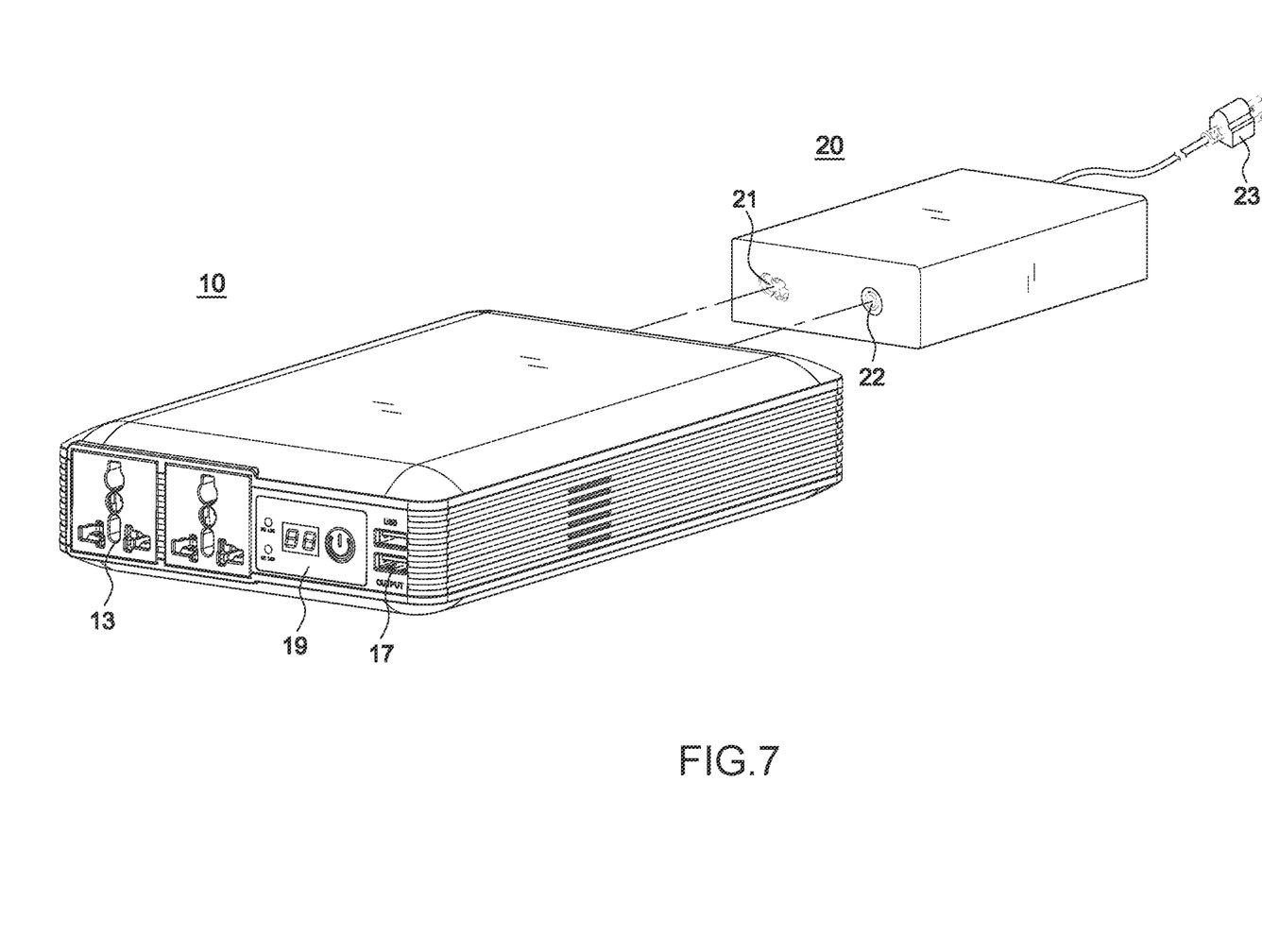
FIG. 7 is a schematic diagram illustrating the connection of the portable power bank and the charger of the second embodiment.
Figure 8:
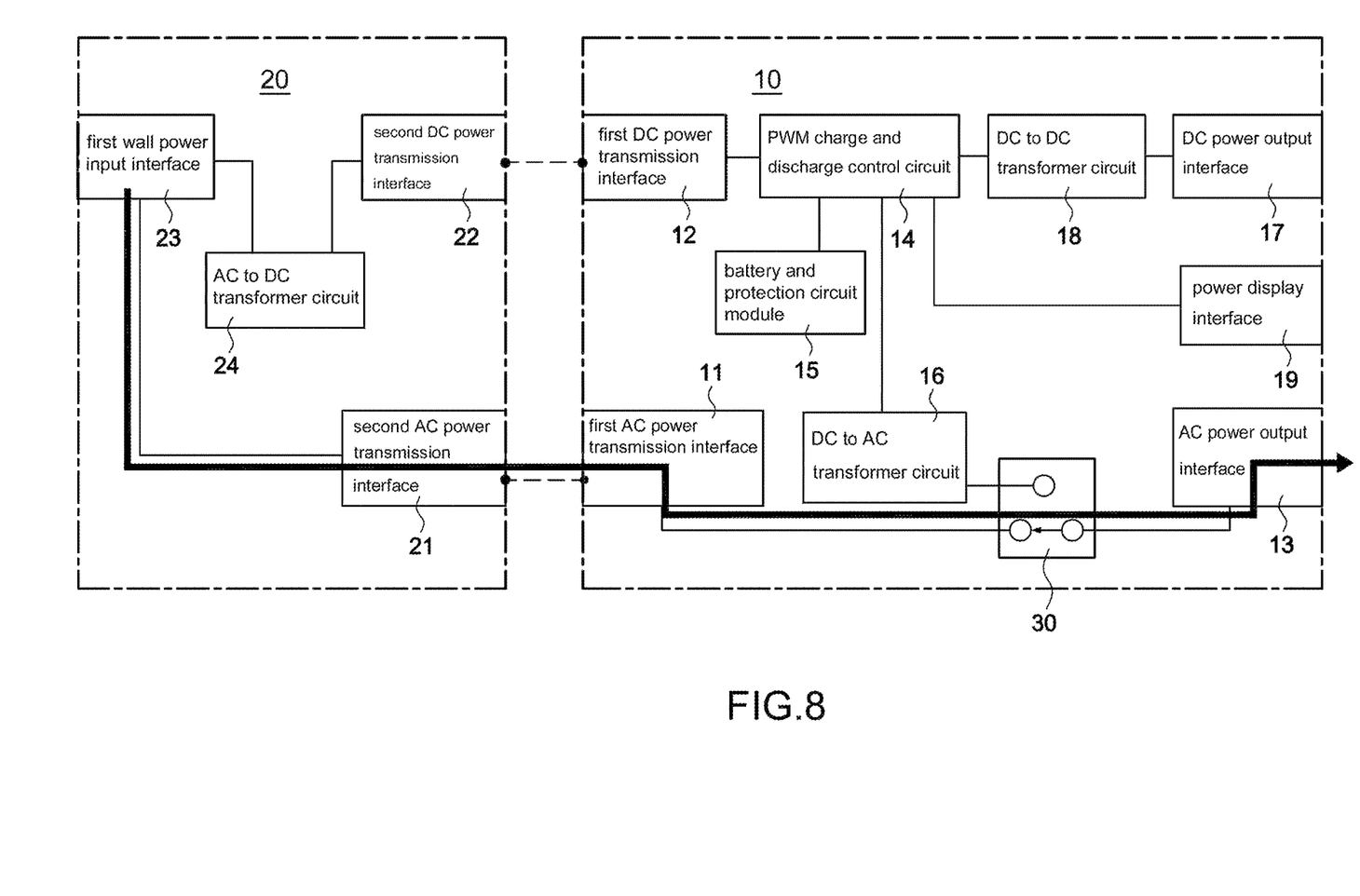
FIG. 8 is a block diagram illustrating the circuit of the second embodiment while the power is supplied by the wall power.
Figure 9:
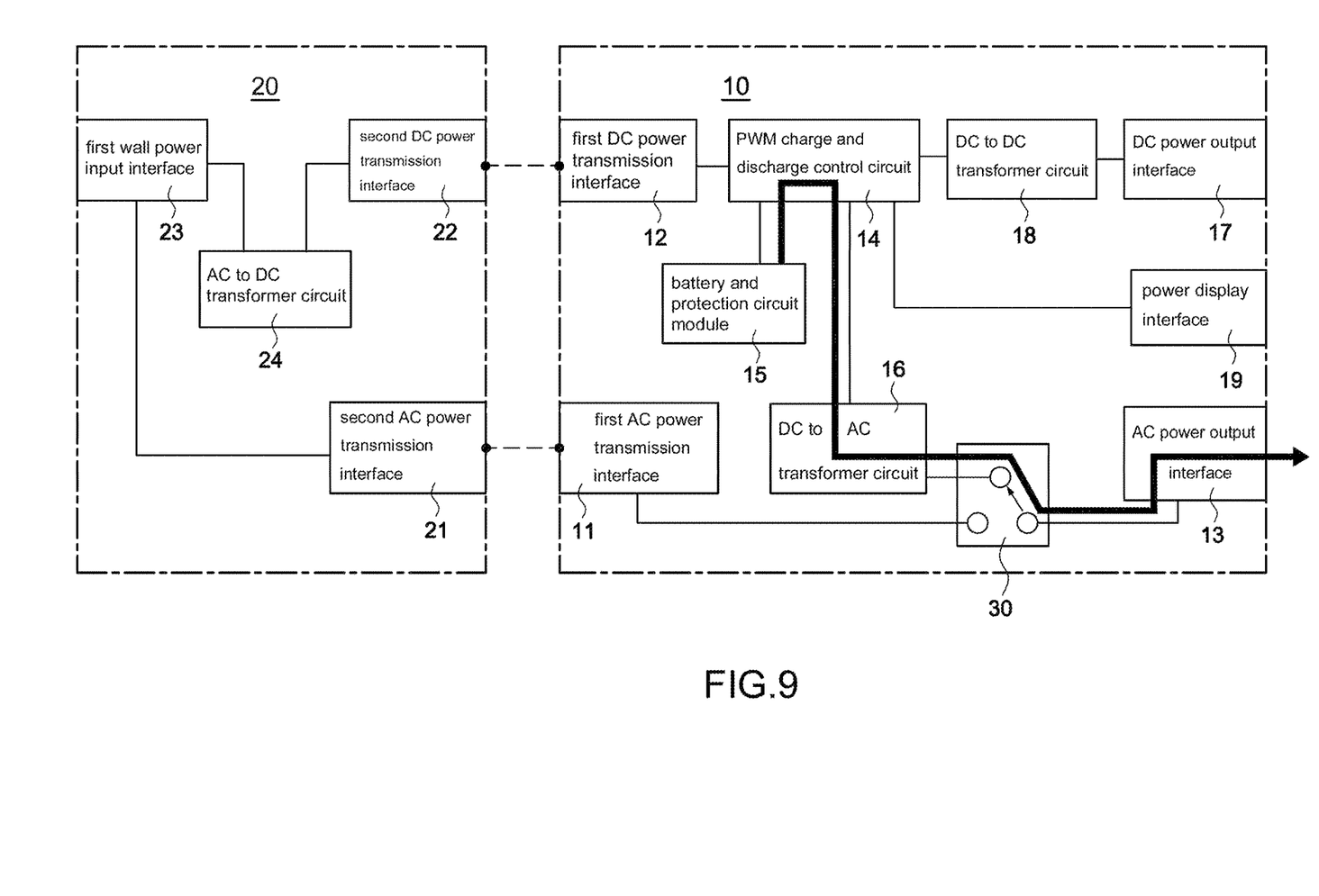
FIG. 9 is a block diagram illustrating the circuit of the second embodiment while the power is supplied by the battery.
Figure 10:
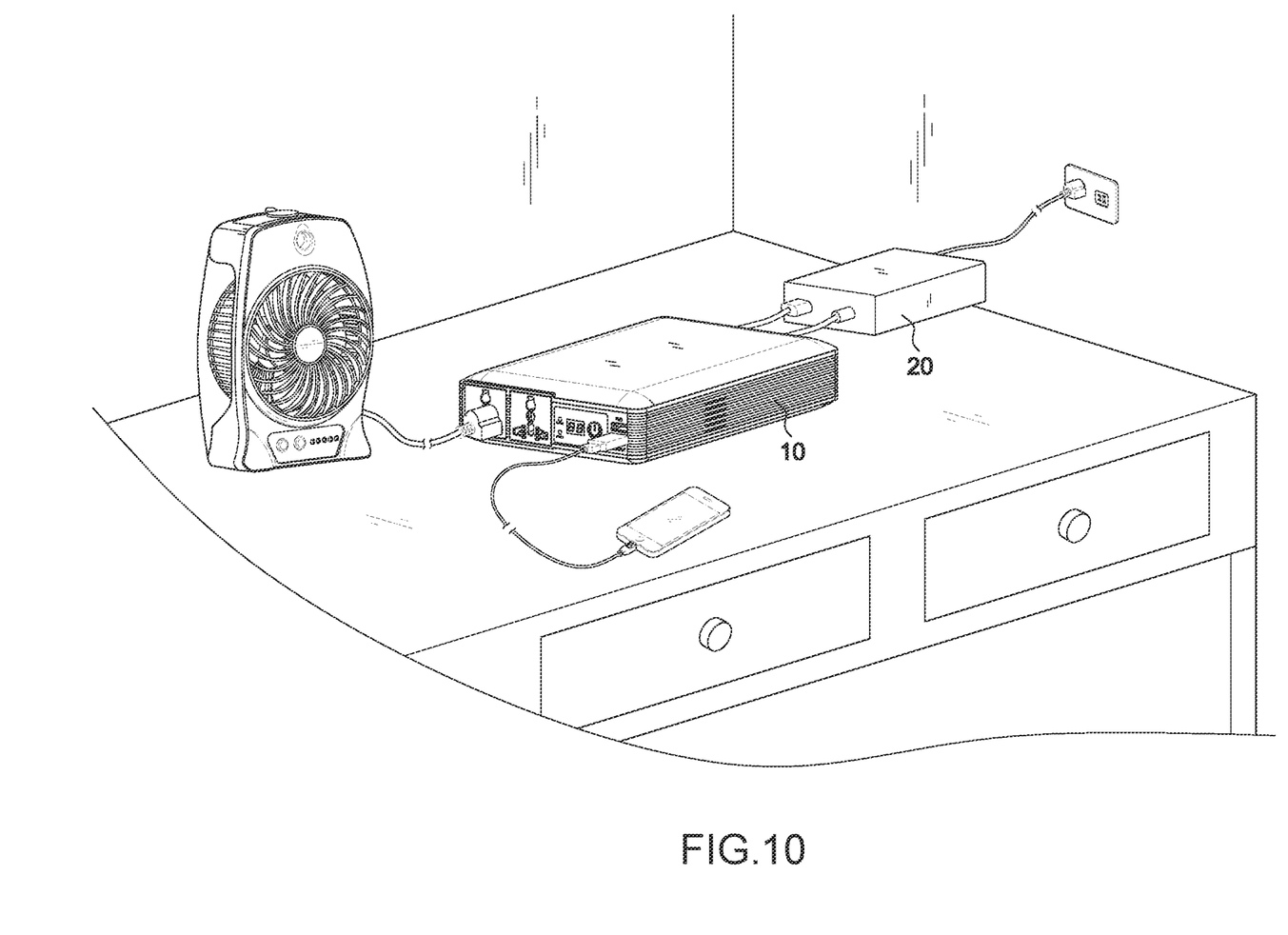
FIG. 10 is a schematic diagram illustrating the portable power bank of the second embodiment having the uninterruptible power supplying feature.
Figure 11:
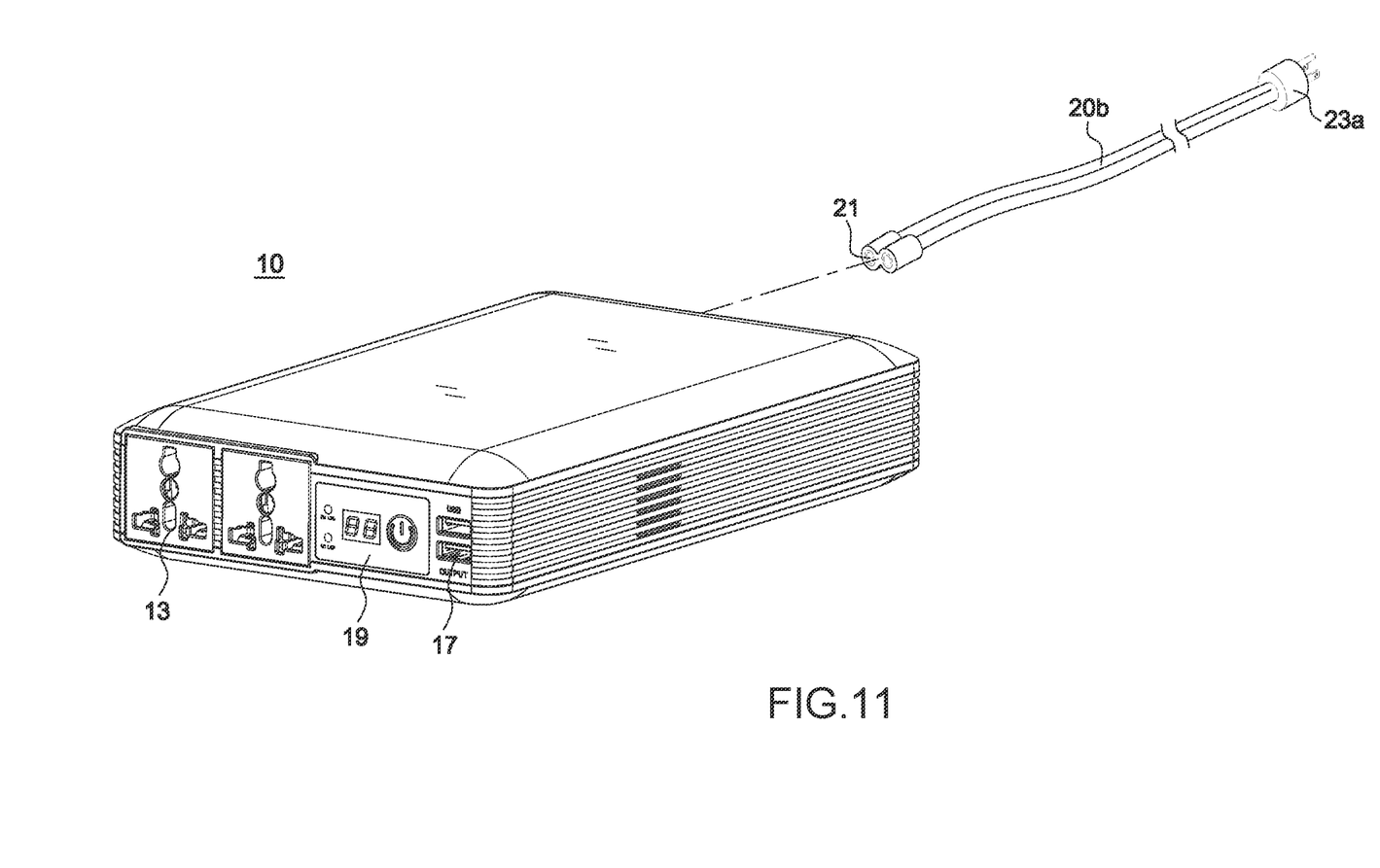
FIG. 11 is a schematic diagram illustrating the connection of the portable power bank and the AC power transmission cable of the third embodiment
Figure 12:
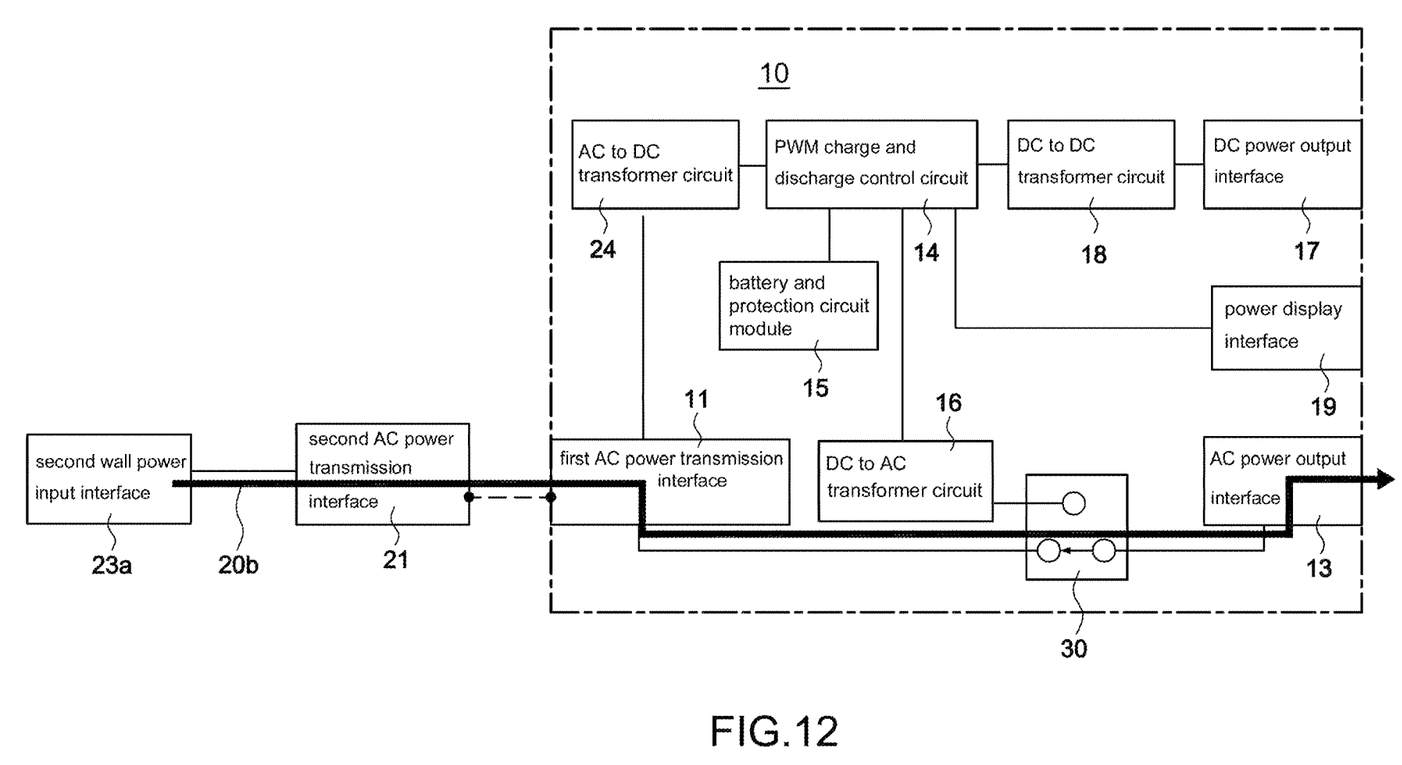
FIG. 12 is a block diagram illustrating the circuit of the third embodiment while the power is supplied by the wall power.
Figure 13:
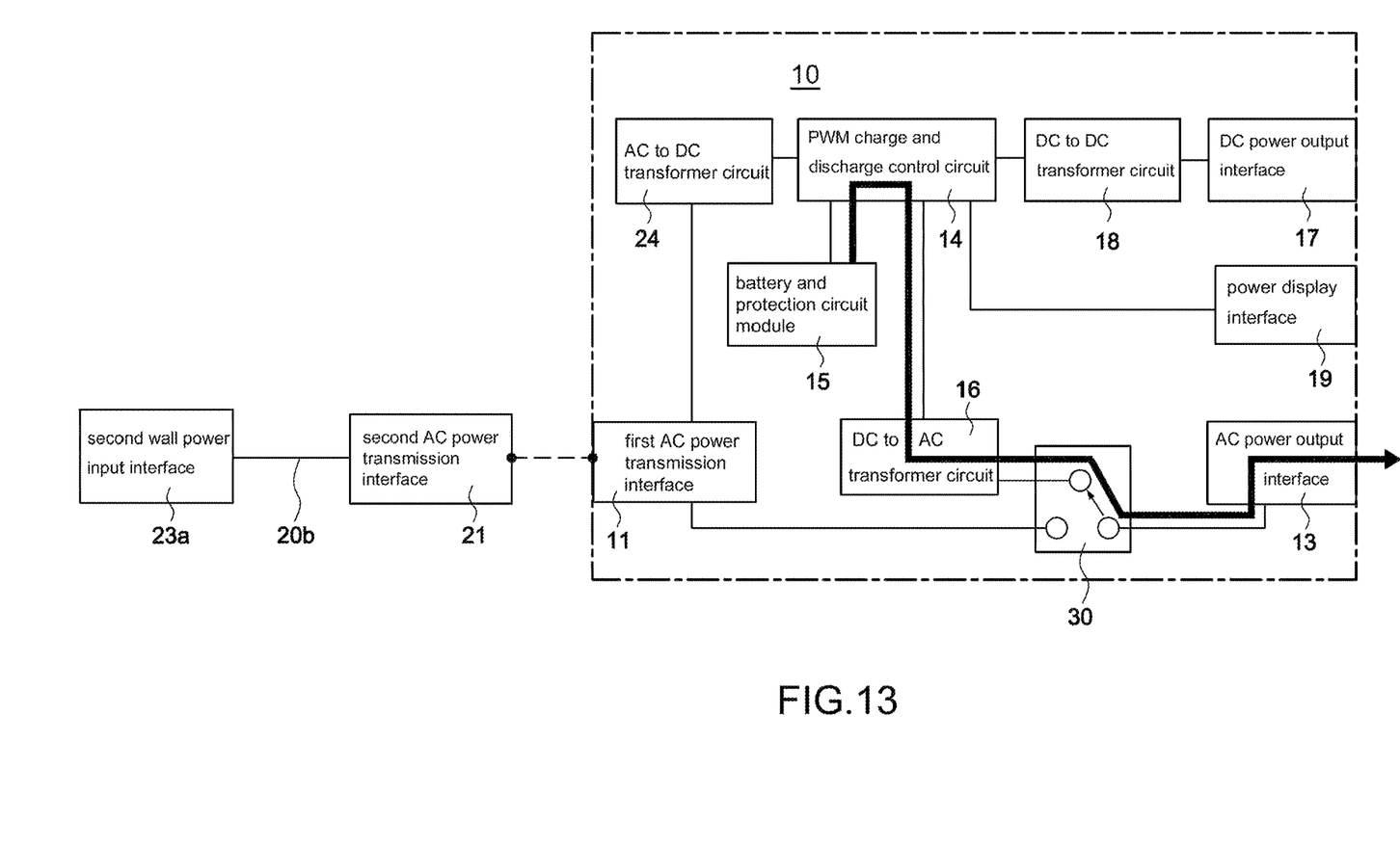
FIG. 13 is a block diagram illustrating the circuit of the third embodiment while the power is supplied by the battery.
Figure 14:
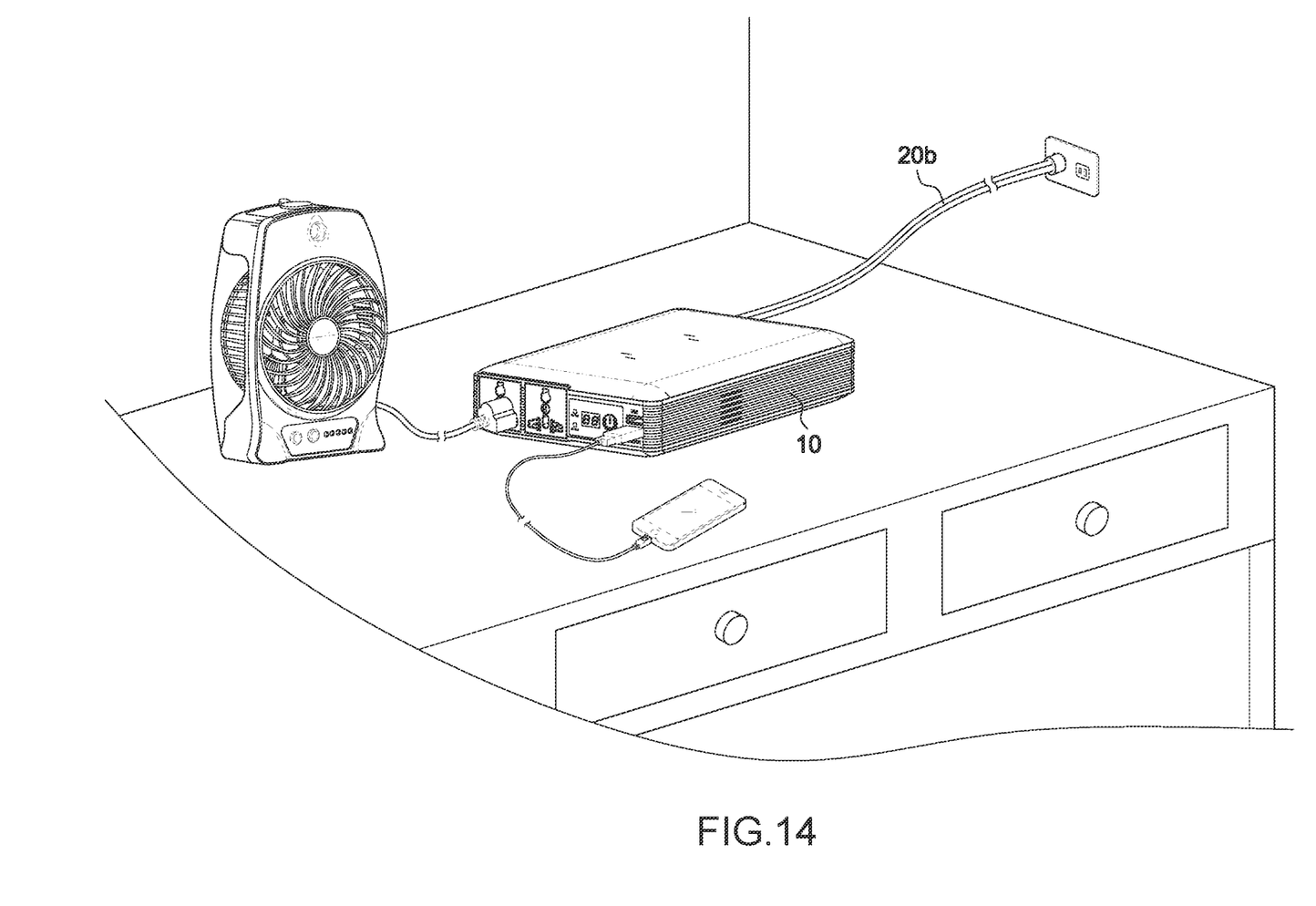
FIG. 14 is a schematic diagram illustrating the portable power bank of the third embodiment having the uninterruptible power supplying feature.

With the feature disclosed above, referring to FIGS. 4-6, when the first DC power transmission interface 12 is coupled to the second DC power transmission interface 22, and when the first AC power transmission interface 11 is coupled to the second AC power transmission interface 21, and the first wall power input interface 23 and second wall power input interface 23a is coupled to the wall power, the battery and the protection circuit module 15 is able to be charged by the AC to DC transformer circuit 24 and the PWM charge and discharge control circuit 14; when the wall power is cut off, the battery and the protection circuit module 15 is able to supply power to the AC power output interface 13 by the PWM charge and discharge control circuit 14, the DC to AC transformer circuit 16 and the automatic power switch 30; Therefore, the present invention has the feature of supplying power uninterruptedly.

Also, referring to FIGS. 7-10, the difference between first and second embodiment is: The charger 20a and the AC power transmission cable 20b is integrated into a charger 20. Moreover, referring to FIGS. 11-14, the difference between first and third embodiment is: the AC to DC transformer circuit 24 is arranged on the portable power bank 10, so the present invention does not required the charger 20a.

Although particular embodiments of the invention have been described in detail for purposes of illustration, various modifications and enhancements may be made without departing from the spirit and scope of the invention. Accordingly, the invention is not to be limited except as by the appended claims

What is claimed is:

1. An uninterruptible portable power bank, including:
a portable power bank, having a first AC power transmission interface, a first DC power transmission interface and a least an AC power output interface, a PWM charge and discharge control circuit, a battery and protection circuit module, a DC to AC transformer circuit and an automatic power switch, the PWM charge and discharge control circuit is coupled to the first DC power transmission interface, the battery and protection circuit module and the DC to AC transformer circuit, the automatic power switch is coupled to the first AC power transmission interface, the AC power output interface and the DC to AC transformer circuit, the automatic power switch is connected to the first AC power transmission interface and the AC power output interface while connected with the wall power, and turn to connect to the DC to AC transformer circuit and AC power output interface while the wall power is cut off;
a charger, having a second DC power transmission interface, a first wall power input interface and an AC to DC transformer circuit, the AC to DC transformer circuit is coupled to the second DC power transmission interface and the first wall power input interface; and
an AC power transmission cable having a second AC power transmission interface and a second wall power input interface;
whereby when the first DC power transmission interface is coupled to the second DC power transmission interface, and when the first AC power transmission interface is coupled to the second AC power transmission interface, and the first wall power input interface and second wall power input interface is coupled to the wall power, the battery and the protection circuit module is able to be charged by the AC to DC transformer circuit and the PWM charge and discharge control circuit; when the wall power is cut off, the battery and the protection circuit module is able to supply power to the AC power output interface by the PWM charge and discharge control circuit, the DC to AC transformer circuit and the automatic power switch.

2. The uninterruptible portable power bank as claimed in claim 1, wherein the portable power bank has more than one DC power output interface and a DC to DC transformer circuit, the DC to DC transformer circuit is coupled to the DC power output interface and the PWM charge and discharge control circuit.

3. The uninterruptible portable power bank as claimed in claim 2, wherein the portable power bank has a power display interface, the power display interface is coupled to the PWM charge and discharge control circuit.

4. An uninterruptible portable power bank, including:
a portable power bank, having a first AC power transmission interface, a first DC power transmission interface and a least an AC power output interface, a PWM charge and discharge control circuit, a battery and protection circuit module, a DC to AC transformer circuit and an automatic power switch, the PWM charge and discharge control circuit is coupled to the first DC power transmission interface, the battery and protection circuit module and the DC to AC transformer circuit, the automatic power switch is coupled to the first AC power transmission interface, the AC power output interface and the DC to AC transformer circuit, the automatic power switch is connected to the first AC power transmission interface and the AC power output interface while connected with the wall power, and turn to connect to the DC to AC transformer circuit and AC power output interface while the wall power is cut off; and
a charger, having a second AC power transmission interface, a second DC power transmission interface, a wall power input interface and an AC to DC transformer circuit, the AC to DC transformer circuit is coupled to the second DC power transmission interface and the wall power input interface, the second AC power transmission interface is coupled to the wall power input interface;
whereby when the first DC power transmission interface is coupled to the second DC power transmission interface, and when the first AC power transmission interface is coupled to the second AC power transmission interface and the wall power input interface is coupled to the wall power, the battery and the protection circuit module is able to be charged by the AC to DC transformer circuit and the PWM charge and discharge control circuit; when the wall power is cut off, the battery and the protection circuit module is able to supply power to the AC power output interface by the PWM charge and discharge control circuit, the DC to AC transformer circuit and the automatic power switch.

5. The uninterruptible portable power bank as claimed in claim 4, wherein the portable power bank has more than one DC power output interface and a DC to DC transformer circuit, the DC to DC transformer circuit is coupled to the DC power output interface and the PWM charge and discharge control circuit.

6. The uninterruptible portable power bank as claimed in claim 5, wherein the portable power bank has a power display interface, the power display interface is coupled to the PWM charge and discharge control circuit.

\* \* \* \* \*